(12) United States Patent
Bowman

(10) Patent No.: US 7,459,632 B2
(45) Date of Patent: Dec. 2, 2008

(54) IN-FLOOR FITTING COVER ASSEMBLY

(75) Inventor: Tim Bowman, Parkersburg, WV (US)

(73) Assignee: The Wiremold Company, West Hartford, CT (US)

( * ) Notice: Subject to any disclaimer, the term of this patent is extended or adjusted under 35 U.S.C. 154(b) by 751 days.

(21) Appl. No.: 10/929,608

(22) Filed: Aug. 30, 2004

(65) Prior Publication Data

US 2005/0050820 A1    Mar. 10, 2005

Related U.S. Application Data

(60) Provisional application No. 60/500,871, filed on Sep. 5, 2003.

(51) Int. Cl.
*H02G 3/14* (2006.01)
(52) U.S. Cl. .......................... 174/66; 174/67; 174/490; 174/482; 220/241; 220/242

(58) Field of Classification Search ................... 174/66, 174/67, 480, 50, 53, 57, 58, 17 CT, 490, 481, 174/482; 220/3.2, 3.3, 3.8, 241, 242, 4.02; 439/535, 536, 136, 142; D13/156, 177; D8/353; 52/220.1, 220.3, 220.5, 220.7
See application file for complete search history.

(56) References Cited

U.S. PATENT DOCUMENTS

| | | | | |
|---|---|---|---|---|
| 3,956,573 A * | 5/1976 | Myers et al. | ................... | 174/67 |
| 4,721,476 A * | 1/1988 | Zeliff et al. | ................. | 439/142 |
| 5,455,388 A * | 10/1995 | Pratt | ........................... | 174/67 |
| 6,179,634 B1 * | 1/2001 | Hull et al. | .................... | 439/536 |
| 6,265,662 B1 * | 7/2001 | Riedy et al. | .................... | 174/67 |
| 6,417,450 B1 * | 7/2002 | Young | .......................... | 174/66 |
| 6,462,277 B1 * | 10/2002 | Young et al. | .................. | 174/66 |
| 6,835,890 B2 * | 12/2004 | Dinh et al. | ..................... | 174/66 |
| 7,193,160 B2 * | 3/2007 | Dinh | ......................... | 220/4.02 |
| 7,276,662 B2 * | 10/2007 | Drane | ........................... | 174/66 |
| 7,319,193 B2 * | 1/2008 | Halterman | .................... | 174/67 |
| 2002/0092664 A1 * | 7/2002 | Young et al. | | |

* cited by examiner

*Primary Examiner*—Angel R Estrada
(74) *Attorney, Agent, or Firm*—McAndrews, Held & Malloy, Ltd.

(57) ABSTRACT

A cover assembly adapted to be mounted over an in-floor fitting, including a frame having a passage defined therethrough, a lid pivotally secured to the frame and positioned over the passage, an egress door movably secured to the lid, and a sealing membrane bonded to an underside of said lid and said egress door.

18 Claims, 10 Drawing Sheets

IN-FLOOR FITTING COVER ASSEMBLY

RELATED APPLICATIONS

The present application relates to and claims priority benefits from U.S. Provisional Patent Application No. 60/500,871, entitled "In-Floor Fitting Cover Assembly," filed Sep. 5, 2003, which is incorporated by reference herein in its entirety.

BACKGROUND OF THE INVENTION

Embodiments of the present invention generally relate to floor box cover assemblies, and more particularly, to floor box cover assemblies having a sealing interface between a gasket and a sealing membrane.

In-floor fittings such as poke-thru fittings, afterset fittings and preset fittings are installed in concrete floors to provide electrical receptacles and communication/data receptacles (or jacks) at desired locations in buildings. As a result, such fittings may be exposed to water, e.g. during carpet cleaning. It is desirable that such fittings are designed to prevent moisture infiltration, particularly into the area of the fitting that contains the receptacles. In this respect, Underwriters Laboratories (UL) proposed certification standards that require such fittings to keep scrub water out of the portion of the fitting that houses the electrical outlet, e.g. the power portion. Scrub water is a soap and water mixture that is typically used when cleaning carpets.

FIG. 1 illustrates an isometric view of a flush cover assembly 10. The flush cover assembly 10 includes a frame 12 mounted over an in-floor fitting in a floor 14 that provides access to electrical outlets. The flush cover assembly 10 includes electrical receptacles 16 covered by hinged lids 18. The hinged lids 18 may be rotated back in the direction of A in order to allow access to the electrical receptacles 16. An electrical cable 20 may interface with an electrical receptacle 16 through a plug 22 disposed at a distal end 24 of the electrical cable 20.

FIG. 2 illustrates a transverse cross-sectional view of the flush cover assembly 10. A compressible gasket 26 is sandwiched between an underside 28 of the frame 12 and an upper surface 30 of the receptacle 16. When the hinged lids 18 are closed, the lids 18 seal against the compressible gasket 26, thereby preventing entry of scrub water into an interior cavity 34 of the electrical receptacle 16. Because only the lids 18 move, the gasket 26 remains in a fixed position. The flush cover assembly 10 suffers from various disadvantages. First, the mating plug 22 is obtrusive and highly visible. Multiple connections exaggerate the obtrusive appearance. Additionally, the mating plug 22 is susceptible to being kicked, and/or knocked out from the electrical receptacle 16 by rolling chairs, vacuum cleaners, and the like.

FIG. 3 illustrates an isometric view of a recessed cover assembly 36. The recessed cover assembly 36 includes a frame 38 mounted over a floor 40 having a fitting. A lid 42 having egress doors 44 allows an electrical cable 46 to pass therethrough while sealing against moisture infiltration and concealing a plug of the cable underneath the lid 42.

FIG. 4 illustrates a transverse cross-sectional view of the recessed cover assembly 36. As shown in FIG. 4, an electrical receptacle 48 is positioned under the floor 40 within an interior cavity 50 defined by a preset fitting 52. A plug 54 located at a distal end 56 of the electrical cable 46 interfaces with the electrical receptacle 48 beneath the surface of the floor 40. The egress doors 44 may be opened and/or removed to allow access into the cavity 50. Once the cable 46 is positioned through an opening created by egress doors 44 being oriented in an open position, the egress doors 44 are closed around the cable 46 such that the cable 46 is pinched therebetween. A gasket 58 is positioned under the egress doors 44 and acts to sealingly engage the cable 46 when the egress doors 44 are closed around the cable 46.

Recessed cover assemblies 36 provide increased protection to electrical mating connections as compared to flush cover assemblies 10. Further, recessed cover assemblies reduce the amount of exposed surface for each electrical connection. The recessed cover assemblies 36 include a gasket 60 positioned between the lid 42 and the frame 38, the gasket 58 between the egress doors 44 and the frame 38, and mating gaskets 58a and 58b. Excess gasket material compressed between two mating surfaces may protrude beyond its intended boundary and create an irregular sealing interface. The irregular sealing interface may allow scrub water to infiltrate into the cavity 50.

Thus, a need exists for a cover assembly that provides greater protection against water infiltration.

SUMMARY OF THE INVENTION

Embodiments of the present invention provide a cover assembly for use with a floor box of the type having an interior compartment that is accessible through an opening in the surface of the floor. The cover assembly includes a frame having a passage defined therethrough, and a lid movably secured to the frame and covering the passage. For example, the lid may be pivotally, latchably, or slidably secured to the frame. The lid is configured to pivot between a closed lid position in which the passage is closed, and an open lid position, in which the passage is open.

At least one egress door is pivotally secured to the lid. The egress door is configured to pivot relative to the lid between an open door position and a closed door position. A sealing membrane is disposed on one side of the lid and the egress door. The sealing membrane provides a moisture-tight seal when the lid and egress door are in the closed lid and closed door positions, respectively.

The cover assembly also includes a gasket positioned over the frame. The gasket is sandwiched between the frame and the sealing membrane when the lid and the egress door are in the closed lid and closed door positions, respectively. The cover assembly may also include a latch member having an engaging portion operatively connected to a clasp that secures the lid in the closed lid position with respect to the frame.

Figure 1:
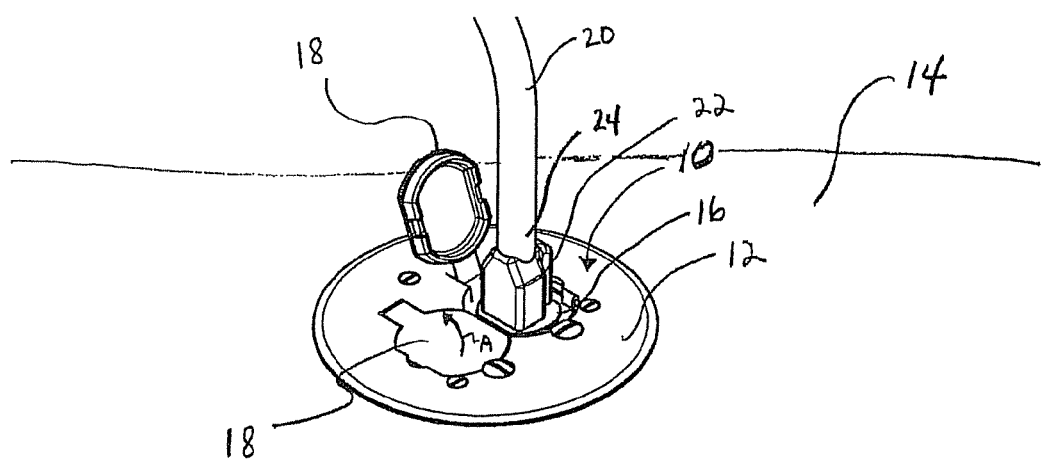
FIG. 1 illustrates an isometric view of a flush cover assembly.
Figure 2:
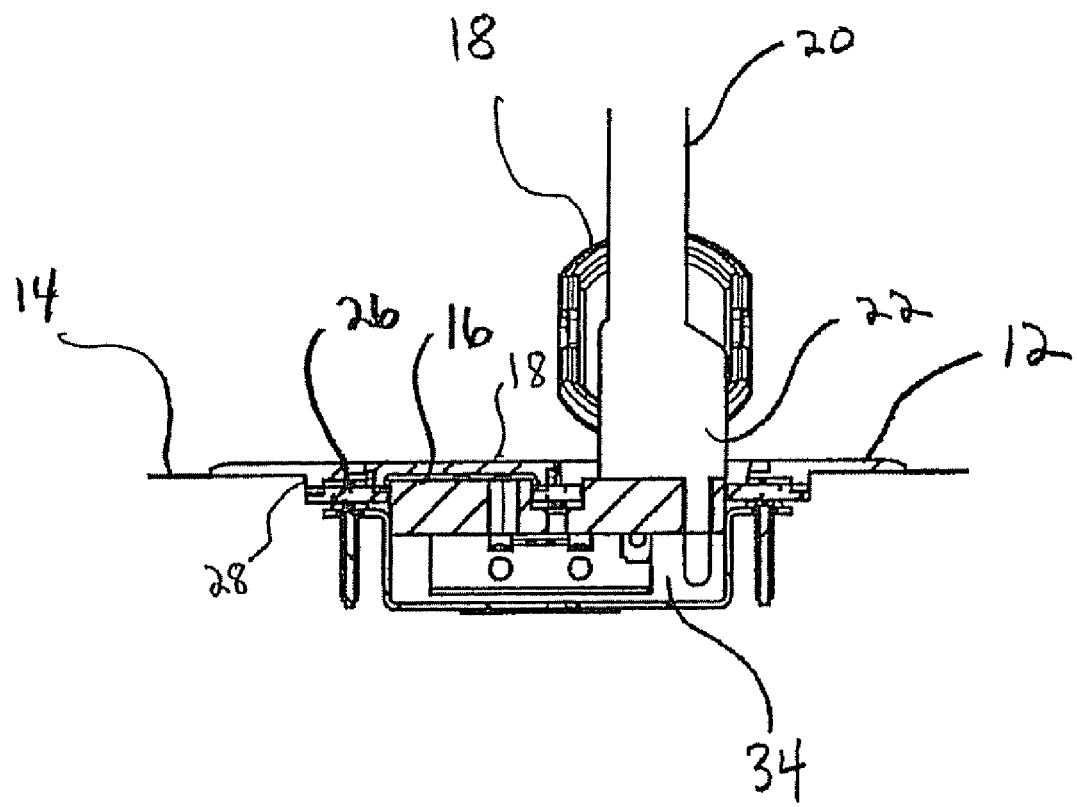
FIG. 2 illustrates a transverse cross-sectional view of a flush cover assembly.
Figure 3:
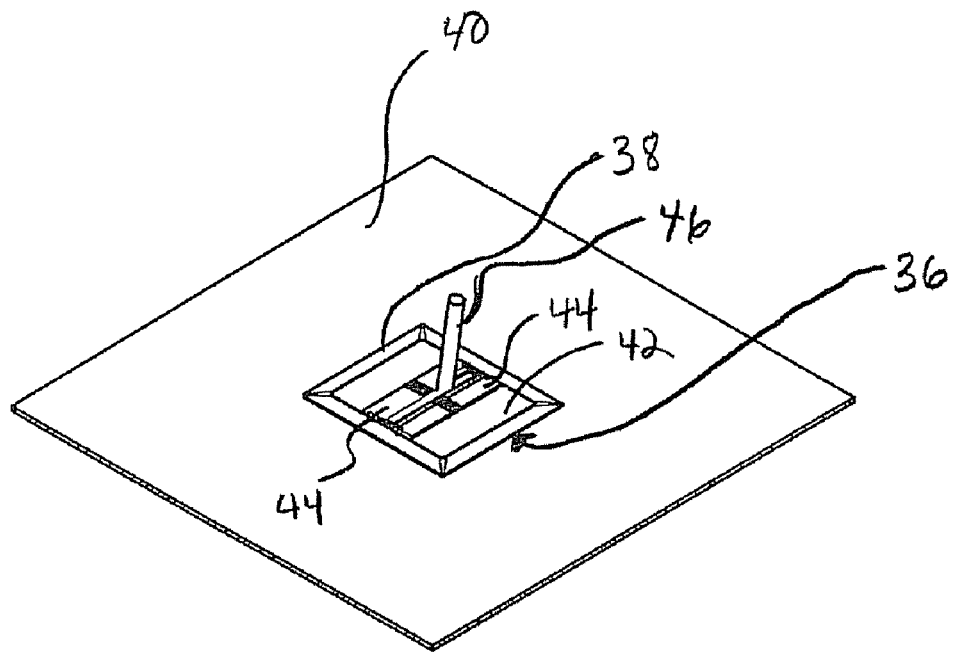
FIG. 3 illustrates an isometric view of a recessed cover assembly.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 4:
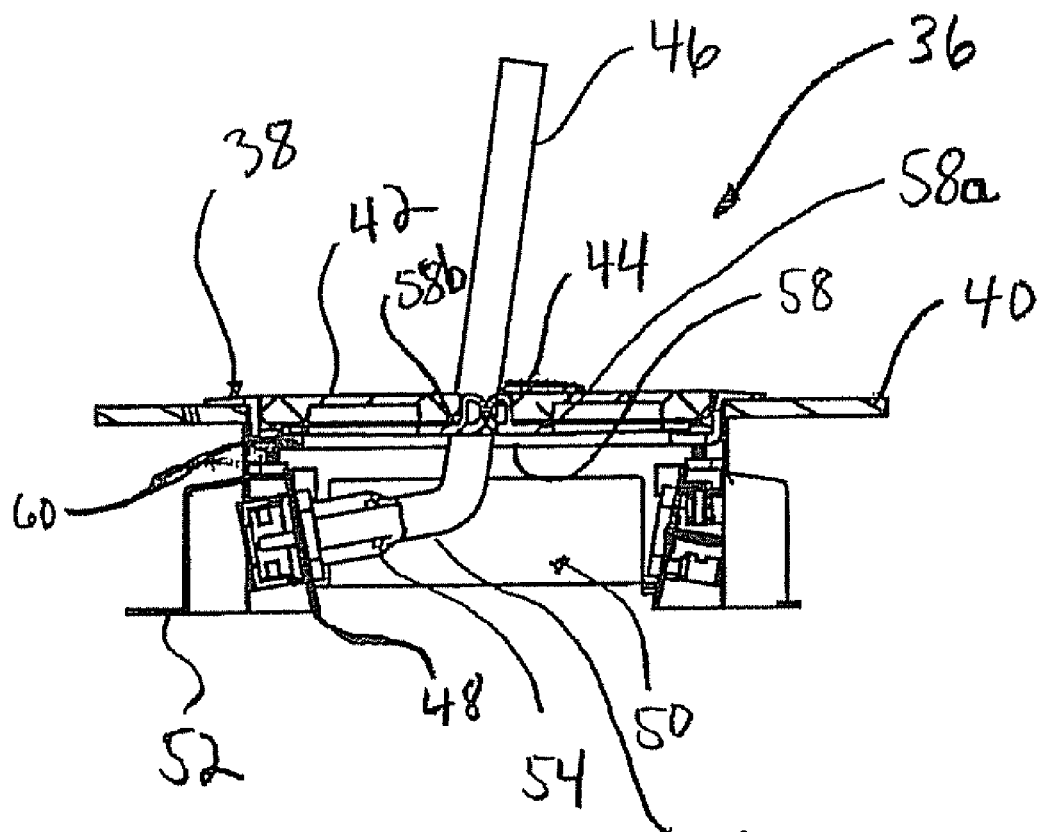
FIG. 4 illustrates a transverse cross-sectional view of a recessed cover assembly.
Figure 5:
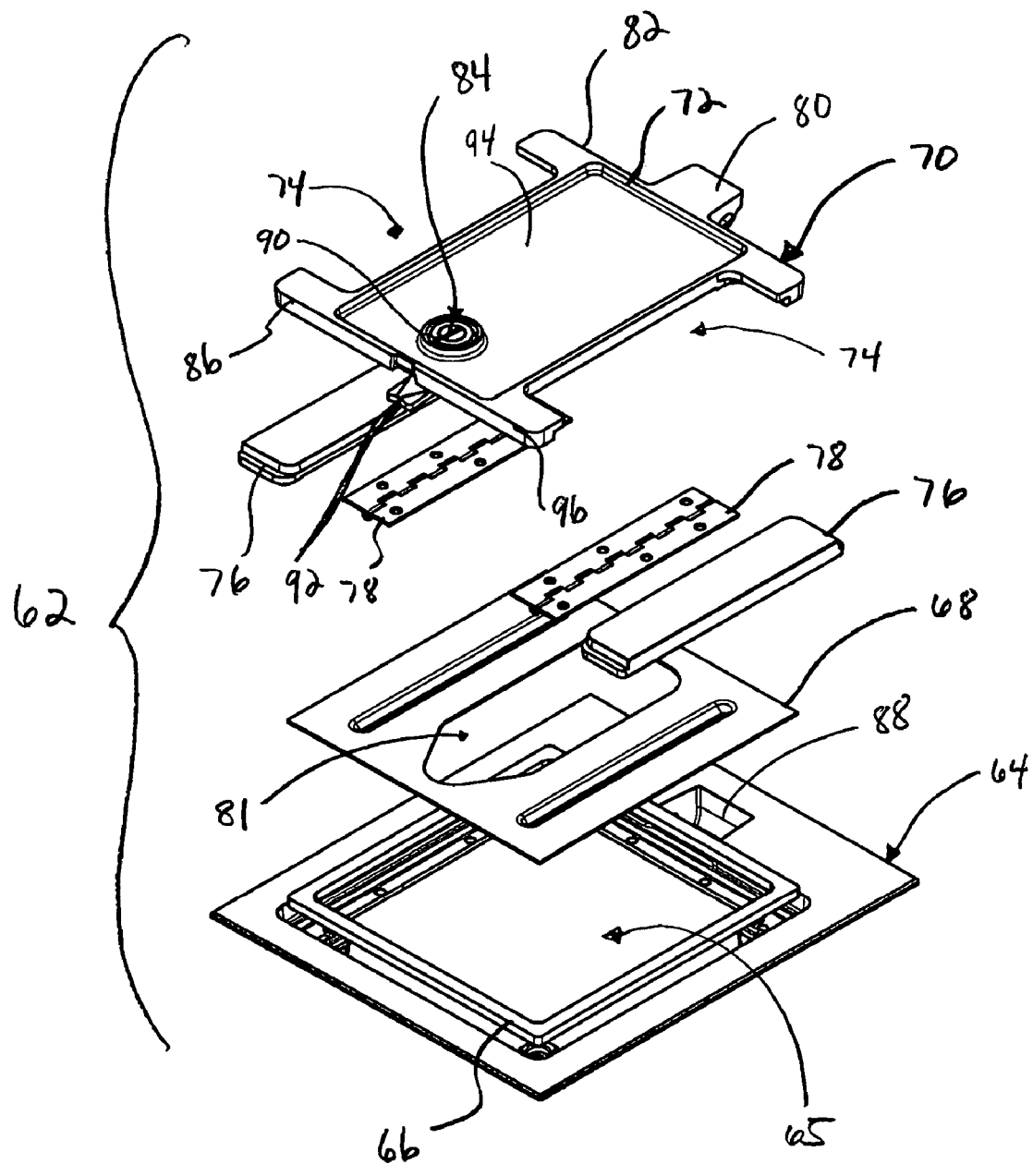
FIG. 5 illustrates an isometric exploded view of a cover assembly according to an embodiment of the present invention.

FIG. 5 illustrates an isometric exploded view of a cover assembly 62 according to an embodiment of the present invention. The cover assembly 62 may be configured to be positioned over an in-floor fitting, such as the fitting 52 shown in FIG. 4. The cover assembly 62 may be used with poke-thru fittings, afterset fittings, or preset fittings. The cover assembly 62 includes a frame 64 defining an interior passage 65 that supports a gasket 66 positioned over a top surface of the frame 64. The gasket 66 is positioned underneath a sealing membrane 68. The cover assembly 62 also includes a lid 70 having a main body 72 and lateral openings 74. Egress doors 76 are configured to be positioned within the lateral openings 74 and open and close over the openings 74 through hinges 78 that are operatively connected to each egress door 76. The hinges 78 are pivotally connected to the main body 72 of the lid 70 to allow the egress doors 76 to pivotally open and close over the openings 74.

The lid 70 includes a pivoting hinge 80 extending from one end 82 and a latch member 84 positioned at the opposite end 86. The pivoting hinge 80 is configured to be pivotally retained by a reciprocal receptacle 88 formed within the frame 64. Thus, the lid 70 may pivot between open and closed positions by way of the pivoting hinge 80 pivoting with respect to the frame 64 through the receptacle 88. The latch member 84 includes a rotatable engaging member 90 that is operatively connected to a clasp 92. The engaging member 90 is positioned on a top surface 94 of the lid 70 while the clasp 92 is positioned underneath the lid 70. As shown in FIG. 5, the clasp 92 extends past an outer edge 96 of the lid 70 when the latch member 84 is in a closed or locked position.

The gasket 66 is configured to be compressed and sandwiched between the frame 64 and the sealing membrane 68 by way of the lid 70 being compressively secured into the frame 64 when the lid 70 is in a closed position with respect to the frame 64. Further, the sealing membrane 68 sealingly mates with, or engages, the gasket 66 when the lid 70 and egress doors 76 are closed.

The sealing membrane 68 may be bonded to the underside of the lid 70 and the undersides of the egress doors 76. The gasket 66 and the sealing membrane 68 may be formed of various materials that prevent water from passing therethrough. For example, the gasket 66 and the sealing membrane 68 may be formed of rubber, latex, foam, an elastomeric material, or the like. The sealing membrane 68 is a flexible material that flexes and folds in relation to the egress doors 76. While the egress doors 76 are in a closed position, the sealing membrane spans the width of each opening 74, mating with the gasket 66, which is disposed underneath the perimeter of the sealing membrane 68.

Figure 6:
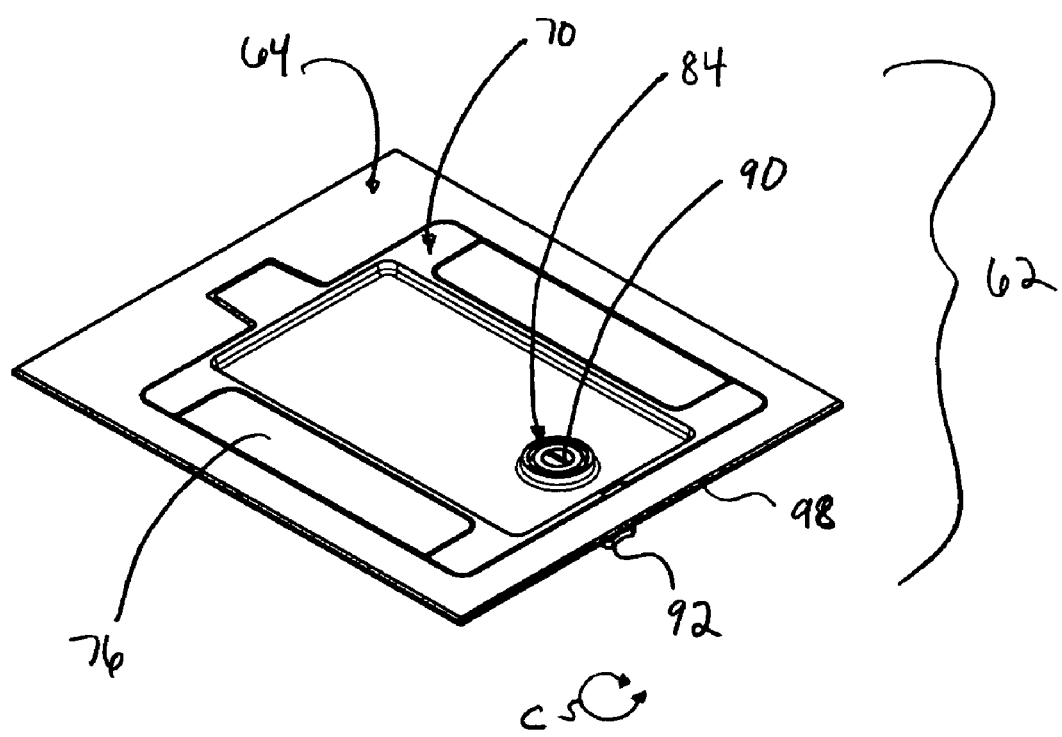
FIG. 6 illustrates an isometric view of a cover assembly with a lid in a closed position according to an embodiment of the present invention.

FIG. 6 illustrates an isometric view of the cover assembly 62 with the lid 70 in a closed position. As shown in FIG. 6, the rotatable engaging member 90 is positioned such that the clasp 92 abuts a portion of the underside of an exterior edge 98 of the frame 64. Thus, the lid 70 is secured in a closed position through an abutting relationship between the clasp 92 and underside of the exterior edge 98. In order to pivot the lid 70 into an open position in the direction of B, the rotatable engaging member 90 is engaged by a tool, such as a flathead screwdriver, to turn in a direction defined by C. As the rotatable engaging member 90 turns, the clasp 92 turns in response thereto. The clasp 92 is turned so that it no longer abuts the underside of the exterior edge 98, thereby allowing one to pivot the lid 70 into an open position. Optionally, the lid 70 may include a locking mechanism, instead of the latch member 84, that snapably engages a reciprocal structure on the frame 64. The locking mechanism may snap into a closed position and allow a user to disengage the locking mechanism to open the lid 70.

As shown in FIG. 6, the egress doors 76 are closed. Because the egress doors 76 are closed, the sealing membrane 68 covers the area underneath the egress doors 76, thereby providing a moisture-tight barrier between the environment above and below the lid 70.

Figure 7:
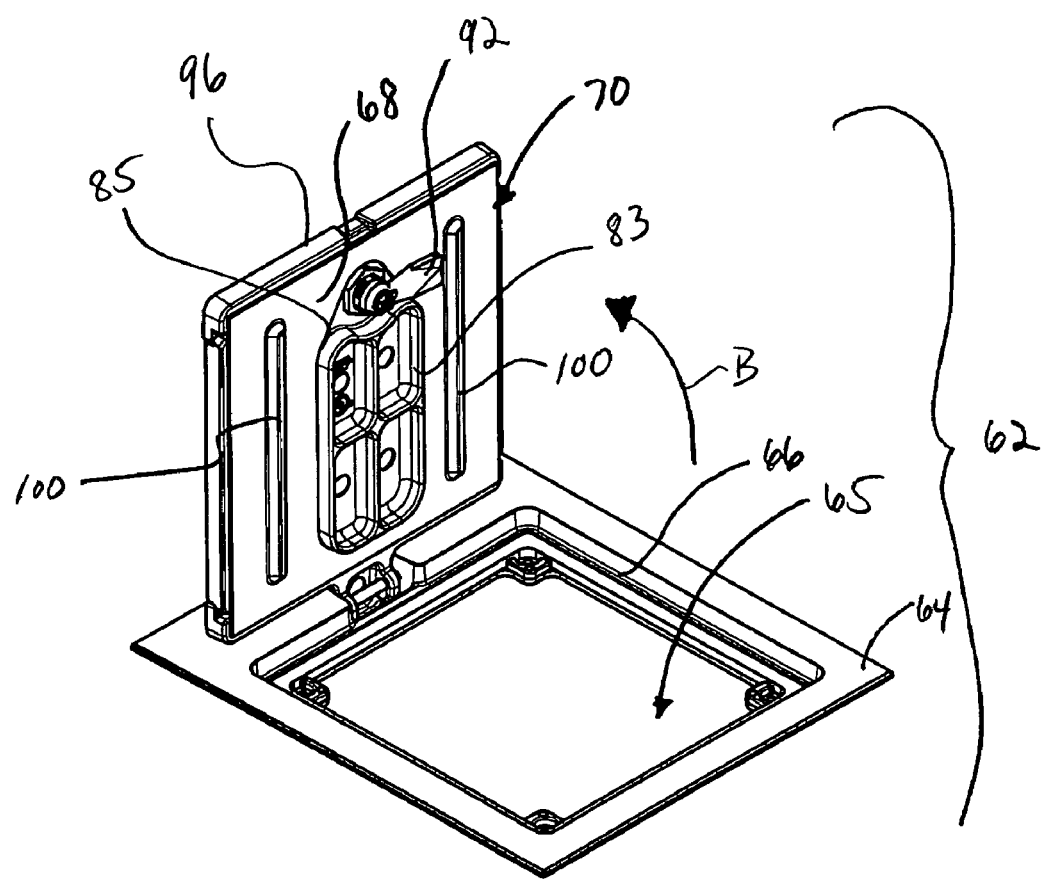
FIG. 7 illustrates an isometric view of a cover assembly with a lid in an open position according to an embodiment of the present invention.

FIG. 7 illustrates an isometric view of the cover assembly 62 with the lid 70 in an open position. The clasp 92 has been rotated so that it does not extend past the outer edge 96 of the lid 70. Thus, the lid 70 may freely move from a closed position to an open position in the direction of B.

The sealing membrane 68 is bonded to the underside of the lid 70 and the egress doors 76. An open central space 81 (shown in FIG. 5) may be formed in the sealing membrane 68 and surrounds a central portion 83 of the lid 70 that extends outwardly from the underside of the lid 70. The interior edge 85 of the sealing membrane 68 that defines the open central space 81 is bonded around the outer perimeter of the central portion 83. The sealing membrane 68 may include weakened portions, areas of which are indicated by lines 100, that allow the sealing membrane 68 to easily move with the egress doors 76. The weakened portions 100 may be scored, recessed, or otherwise reduced areas of material that allow the sealing membrane 68 to easily flex. Optionally, the sealing membrane 68 does not include the weakened portions.

When the egress doors 76 are opened, the sealing membrane 68 pivots along with the egress doors 76 to allow a cable to pass into the in-floor fitting. When the egress doors 76 are closed, the portion of the sealing membrane 68 positioned underneath the egress doors 76 sealingly mates with the gasket 66, thereby preventing moisture from leaking into the in-floor fitting. Alternatively, the egress doors 76 may be configured to pivot outwardly from said lid 70 away from the in-floor fitting. That is, the egress doors 76 may pivot toward an open position in a direction opposite to that shown in FIG. 7.

Figure 8:
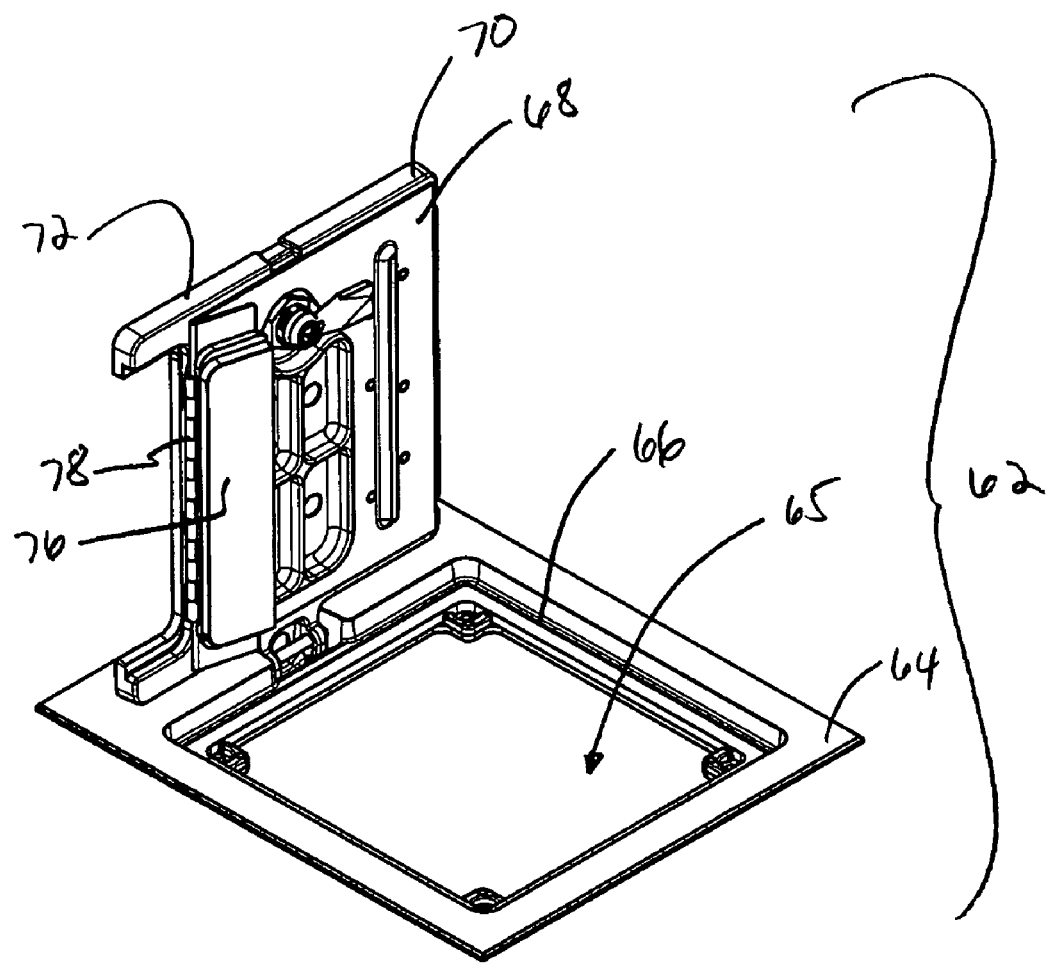
FIG. 8 illustrates an isometric view of a cover assembly with a lid in an open position and an egress door folded under the lid according to an embodiment of the present invention.

FIG. 8 illustrates an isometric view of the cover assembly 62 with the lid 70 in an open position and an egress door 76 folded under the lid 70. The egress doors 76 pivot relative to the main body 72 of the lid 70 about the hinge 78. The egress doors 76 may be configured to pivot toward or away from the passage 65 when the egress doors 76 are opened.

Figure 9:
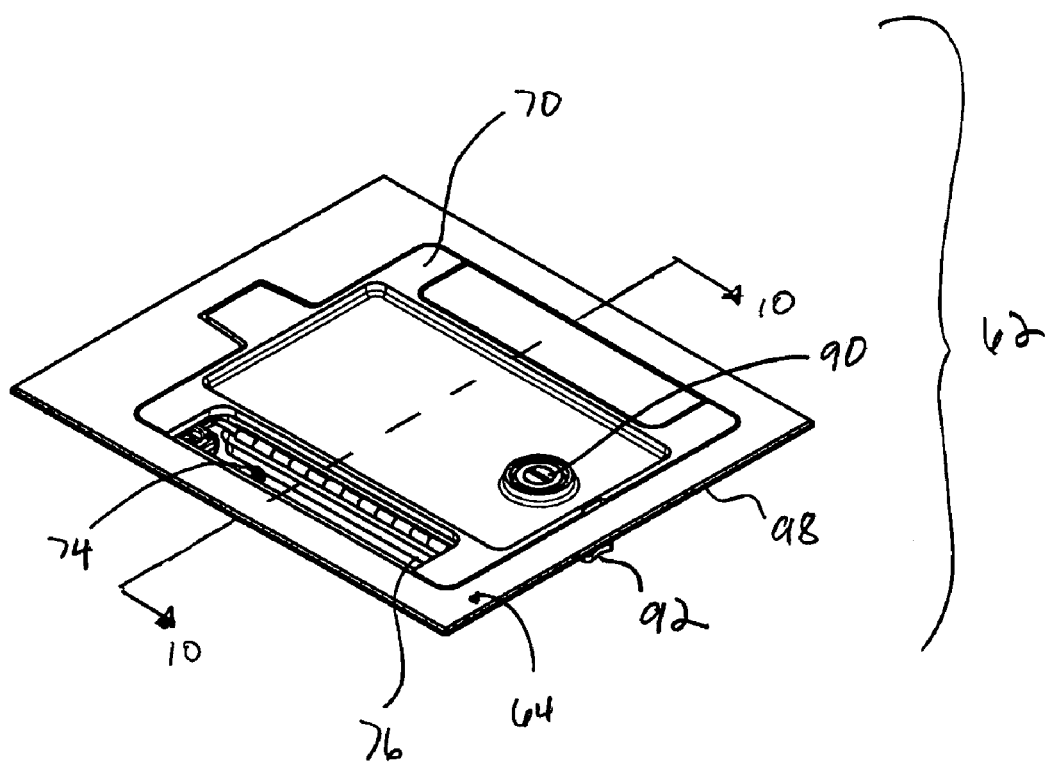
FIG. 9 illustrates an isometric view of a cover assembly with a lid in a closed position and an egress door folded under the lid according to an embodiment of the present invention.

FIG. 9 illustrates an isometric view of the cover assembly 62 with the lid 70 in a closed position and an egress door 76 folded under the lid 70. The egress door 76 folds under the lid 70 to allow an electrical cable to pass through the opening 74 into the in-floor fitting over which the cover assembly 62 is mounted. As shown in FIG. 9, the rotatable engaging member 90 is positioned in a locked position so that the clasp 92 is positioned underneath an exterior edge 98 of the frame 64.

Figure 10:
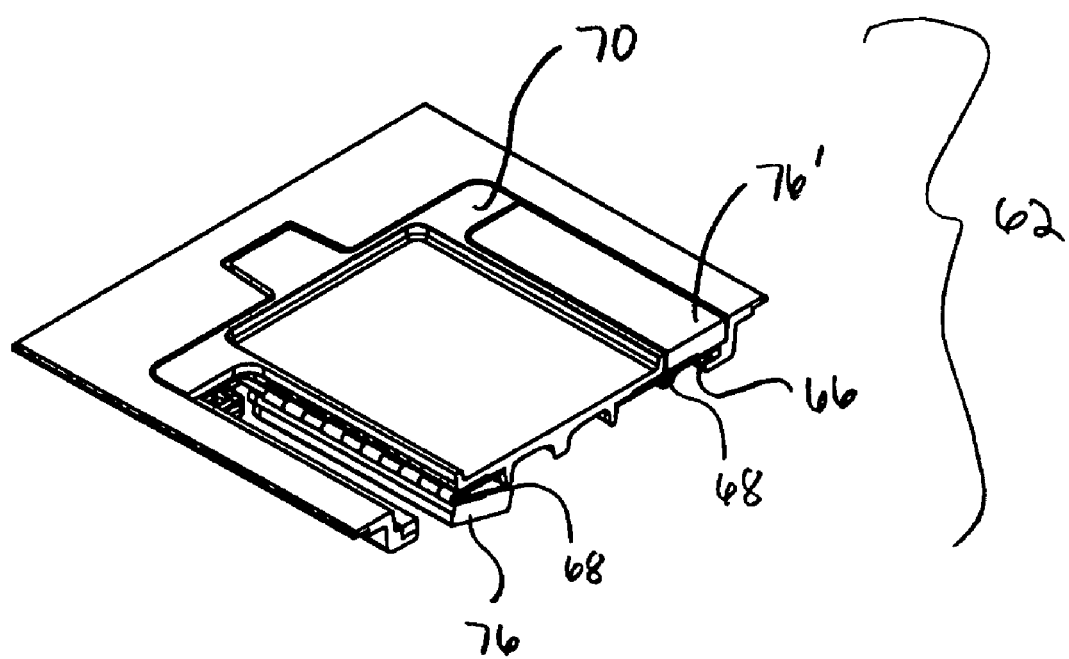
FIG. 10 illustrates a cross-sectional view of a cover assembly through line 10-10 of FIG. 9.

FIG. 10 illustrates a cross-sectional view of the cover assembly 62 through line 10-10 of FIG. 9. The sealing membrane 68 positioned under the closed egress door 76' is positioned over a portion of the gasket 66. The egress doors 76 and 76' may be opened and closed when the lid 70 is in an open position. Alternatively, the gasket 66 and the egress doors 76 and 76' may both be formed of resilient materials that allow both to flex, bend, and the like, and return to an original shape.

Referring again to FIG. 5, for example, the sealing membrane 68 includes an open central space 81. Alternatively, the sealing membrane 68 may not include the open central space 81 but, instead, be a single contiguous piece of material. Additionally, the cover assembly 62 may include an additional gasket and/or sealing membrane positioned beneath the frame 64. That is, an additional sealing membrane and/or gasket may be configured to be compressively sandwiched between an underside of the frame 64 and the floor.

Also, alternatively, the openings 74 may be formed in the interior (as opposed to the edges) of the main body such that each opening is bounded by material defined by the main body 72 of the lid. The openings 74 may be oriented in any direction on the main body 72. Further, more or less than two openings 74 (and egress doors 76) may be included within the cover assembly 62. For example, the lid 72 may be configured to pivotally support one or three egress doors. Also, the egress doors 76 may be slidably retained by the lid 72. For example, instead of pivoting with respect to the lid 70, the lid 70 may include recessed areas formed in the underside of the lid 70, or interior chambers, that allow the egress doors 76 to slide into and out of the main body 72 of the lid 70.

Additionally, the sealing membrane 68 may be used with a flush cover assembly, such as flush cover assembly 10. That is, a sealing membrane, such as the sealing membrane 68 (but formed in a circular shape) may be bonded to the underside of the frame 12 of the flush cover assembly 10. Separate sealing membranes my be bonded to the underside of the hinged lids 18 and the frame 12. The lids of the flush cover assembly may sealingly mate with a sealing membrane that is bonded to the underside of the lids by way of a gasket that surrounds a perimeter of the outlet opening.

Thus, embodiments of the present invention provide a cover assembly that includes a regular sealing interface even after repeated openings. The cover assembly provides greater protection against water infiltration. That is, the cover assembly provides a moisture-tight barrier between a lid and an interior of a in-floor fitting over which the cover assembly is mounted when the lid and egress doors are closed.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

The invention claimed is:

1. A cover assembly for use with an in-floor fitting of the type having an interior compartment that is accessible through an opening in the surface of the floor, the cover assembly comprising:
a frame overlying the fitting and including a passage that provides access to the fitting;
a lid pivotally secured to said frame and covering said passage, said lid being configured to pivot between a closed position at which said passage is closed, and an open position, in which said passage is open;
at least one egress door pivotally secured to said lid, said at least one egress door being configured to pivot relative to said lid between an open door position and a closed door position; and
a sealing membrane disposed on one side of said lid and said at least one egress door, said sealing membrane providing a moisture-tight seal when said lid and said at least one egress door are in said closed lid and closed door positions, respectively.

2. The cover assembly of claim 1, further comprising a gasket positioned over said frame, said gasket being sandwiched between said frame and said sealing membrane when said lid and said at least one egress door are in said closed lid and closed door positions, respectively.

3. The cover assembly of claim 1, further comprising a latch member having an engaging portion operatively connected to a clasp that secures said lid in said closed lid position with respect to said frame.

4. The cover assembly of claim 1, wherein said at least one egress door is pivotally secured to said lid through at least one hinge.

5. The cover assembly of claim 2, wherein said lid is in the closed position and said at least one egress door is in the open door position, wherein said sealing membrane folds under said lid, and wherein an outer perimeter of said sealing membrane sealingly engages said gasket.

6. A cover assembly adapted to be mounted over an in-floor fitting, comprising:
a lid movably secured over the in-floor fitting;
an egress door movably secured to said lid;
a sealing membrane bonded to an underside of said lid and said egress door; and
a gasket positioned over the in-floor fitting, said gasket sealingly mating with said sealing membrane when said lid and said egress door are closed over said passage.

7. The cover assembly of claim 6, further comprising a latch member having an engaging portion operatively connected to a clasp that secures said lid in a closed lid position.

8. The cover assembly of claim 6, wherein said egress door is pivotally secured to said lid through a hinge.

9. The cover assembly of claim 6, wherein said egress door is slidably secured to said lid.

10. The cover assembly of claim 6, further comprising at least one additional egress door.

11. The cover assembly of claim 6, wherein said sealing membrane is formed of one of rubber, foam, and an elastomeric material.

12. A cover assembly adapted to be mounted over an in-floor fitting formed within a floor, comprising:
a frame configured to be secured to one of the floor and an upper surface of the in-floor fitting, said frame having a passage defined therethrough and configured to allow access into the in-floor fitting;
a lid pivotally secured to said frame and positioned over said passage;
an egress door movably secured to said lid, said egress door opening to provide access through said passage;
a sealing membrane bonded to an underside of said lid and said egress door, said sealing membrane configured to protect the in-floor fitting from moisture infiltration when said lid and egress door are closed; and
a gasket positioned over said frame, said gasket being disposed between said frame and said sealing membrane when said lid and said egress door are closed over said passage, said sealing membrane and said gasket forming a moisture-tight interface therebetween when said lid and said egress door are closed.

13. The cover assembly of claim 12, further comprising a latch member having an engaging portion operatively connected to a clasp that secures said lid in a closed lid position with respect to said frame.

14. The cover assembly of claim 12, wherein said egress door is pivotally secured to said lid through a hinge.

15. The cover assembly of claim 12, wherein said egress door is slidably secured to said lid.

16. The cover assembly of claim 12, further comprising at least one additional egress door.

17. The cover assembly of claim 12, wherein said sealing membrane is composed of one of rubber, foam, and an elastomeric material.

18. The cover assembly of claim 12, wherein said lid is in a closed position and said egress door is in an open door position, wherein said sealing membrane folds under said lid, and wherein an outer perimeter of said sealing membrane sealingly engages said gasket, said sealing membrane providing a moisture-tight seal when said lid and said egress door are closed.

* * * * *